US012571440B2

(12) United States Patent
Bae et al.

(10) Patent No.: US 12,571,440 B2
(45) Date of Patent: Mar. 10, 2026

(54) BRAKE APPARATUS FOR VEHICLE

(71) Applicant: HYUNDAI MOBIS Co., Ltd., Seoul (KR)

(72) Inventors: Ji Su Bae, Yongin-si (KR); Soon Oh Chung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 471 days.

(21) Appl. No.: 18/086,101

(22) Filed: Dec. 21, 2022

(65) Prior Publication Data

US 2023/0349432 A1    Nov. 2, 2023

(30) Foreign Application Priority Data

Apr. 27, 2022    (KR) ........................ 10-2022-0052048

(51) Int. Cl.
 *F16D 55/228*    (2006.01)
 *F16D 65/00*    (2006.01)
 F16D 55/00    (2006.01)

(52) U.S. Cl.
 CPC ....... *F16D 55/228* (2013.01); *F16D 65/0087* (2013.01); *F16D 2055/002* (2013.01)

(58) Field of Classification Search
 CPC ............. F16D 55/228; F16D 2055/002; F16D 65/0075
 See application file for complete search history.

(56) References Cited

U.S. PATENT DOCUMENTS

| | | | | |
|---|---|---|---|---|
| 5,515,948 | A | * | 5/1996 | Gilliland ............... F16D 55/228 188/72.5 |
| 6,062,349 | A | * | 5/2000 | Boisseau ............... F16D 65/095 188/73.45 |
| 2004/0251093 | A1 | * | 12/2004 | Simmons .................. B62L 3/08 188/72.4 |
| 2023/0037330 | A1 | * | 2/2023 | Yoon ........................ F16D 65/12 |

FOREIGN PATENT DOCUMENTS

| | | | | | |
|---|---|---|---|---|---|
| KR | | 200155230 Y1 | * | 8/1999 | ............... F16L 9/04 |
| KR | | 10-1883732 B1 | | 8/2018 | |
| WO | WO-2022114085 A1 | | * | 6/2022 | ........... B60T 17/222 |

* cited by examiner

*Primary Examiner* — David R Morris
(74) *Attorney, Agent, or Firm* — Morgan, Lewis & Bockius LLP

(57) ABSTRACT

A first caliper housing may include a first caliper housing including an inlet through which oil enters and one or more first flow paths connected to the inlet and allowing oil to pass therethrough, a second caliper housing disposed opposite to the first caliper housing, and including one or more second flow paths allowing oil to pass therethrough and connected to one or more cylinders, respectively, a first coupling part coupling the first caliper housing and the second caliper housing, and one or more second coupling parts coupling the first caliper housing and the second caliper housing, and respectively including a connecting flow path portion connecting a corresponding one of the first flow path and a corresponding one of the second flow paths so that oil passes therethrough.

13 Claims, 13 Drawing Sheets

— Oil

BRAKE APPARATUS FOR VEHICLE

CROSS-REFERENCE TO RELATED APPLICATION

This application claims the benefit under 35 USC § 119(a) of Korean Patent Application No. 10-2022-0052048, filed on Apr. 27, 2022, the entire disclosure of which are incorporated herein by reference for all purposes.

BACKGROUND

Field

Exemplary embodiments of the present disclosure relate to a brake apparatus for a vehicle, and more particularly, to a brake apparatus for a vehicle having a simplified fabrication process, a reduced number of components, and strength.

Discussion of the Background

In general, a brake apparatus for a vehicle is a hydraulic apparatus that brakes vehicle wheels by pressing brake pads against a brake disk. That is, the brake apparatus for a vehicle includes a plurality of cylinders disposed on both sides of a caliper, in which the cylinders operate the brake pads by pushing pistons by receiving hydraulic pressure.

The caliper is categorized as an internal caliper in which a flow path allowing oil to pass therethrough is formed inside the caliper and an external caliper having a pipe allowing oil to pass therethrough and a flow path formed in an outer portion of the caliper.

In the case of the internal caliper, oil is transferred to the cylinder in one direction through a flow path. Thus, there is a problem in that the piston may have non-uniform surface pressure during the contact of the brake pads. In addition, the internal caliper is fabricated using a core having a complicated shape, the formation of the flow path inside the internal caliper should be considered. Thus, there is a problem in that a fabrication process of the internal caliper is difficult and complicated.

In the case of the external caliper, oil is transferred to the cylinder in one direction through a flow path as in the case of the internal caliper. Thus, there is a problem in that the piston may have non-uniform surface pressure during the contact of the brake pads. In addition, components for the flow path, such as a pipe, are added, which causes a problem of an increase in component cost attributable to an increase in the number of components and lead to a complicated assembly process. Therefore, there is demand for improving such problems.

A background art of the present disclosure is disclosed in Korean Patent No. 10-1883732 (registered on Jul. 25, 2018, entitled "Caliper Apparatus and Brake Apparatus and Method of Fabricating Same")

SUMMARY

Various embodiments are directed to a brake apparatus for a vehicle, the brake apparatus having a simplified fabrication process, a reduced number of components, and strength.

In an embodiment, a brake apparatus for a vehicle, the brake apparatus may include: a first caliper housing including an inlet through which oil enters and one or more first flow paths connected to the inlet and allowing oil to pass therethrough; a second caliper housing disposed opposite to the first caliper housing, and including one or more second flow paths allowing oil to pass therethrough and connected to cylinders, respectively; a first coupling part coupling the first caliper housing and the second caliper housing; and one or more second coupling parts coupling the first caliper housing and the second caliper housing, and respectively including a connecting flow path portion connecting a corresponding one of the first flow path and a corresponding one of the second flow paths so that oil passes therethrough.

The second coupling parts may include a plurality of second coupling parts disposed on both sides of the first coupling part.

The first flow paths may include a plurality of first flow paths, and the second flow paths include a plurality of second flow paths to be disposed opposite to the plurality of first flow paths, respectively. Each of the plurality of second coupling parts may connect one of the plurality of first flow paths and one of the plurality of second flow paths opposite to each other, thereby allowing oil to pass through.

The plurality of second coupling parts may be disposed on both sides of the first coupling part so as to be symmetric to each other.

The connecting flow path portion may include a groove in an inner circumferential surface thereof, the groove being configured to reduce flow resistance of oil.

The connecting flow path portion may include a connecting inlet through which oil enters from a corresponding one of the plurality of first flow paths and a discharge hole connected to a corresponding one of the plurality of second flow paths such that oil is discharged to the corresponding second flow path.

Each of the plurality of second coupling parts may include: a bolt coupling the first caliper housing and the second caliper housing, with the connecting flow path portion being disposed inside the bolt; and a bleeder screw rotatably coupled to the bolt and having an air intake hole allowing air to enter toward the connecting flow path portion.

Each of the plurality of second coupling parts may further include an elastic member detachably coupled to the bleeder screw and configured to close the air intake hole.

The bolt of each of the plurality of second coupling parts may include: a bolt body including the connecting flow path portion; and a bolt extension connected to the bolt body, with the bleeder screw being rotatably coupled to the bolt extension.

The bleeder screw of each of the plurality of second coupling parts may include: a bleeder screw body screw-coupled to the bolt extension, with the elastic member being coupled to the bleeder screw body, and the air intake hole being provided in the bleeder screw body; and a bleeder screw contact portion connected to the bleeder screw body and in contact with the bolt extension.

The bleeder screw contact portion may be configured such that a width thereof decreases with a distance from the bleeder screw body, and the bolt extension has defined therein a contact hole having a shape conforming to the bleeder screw contact portion.

The first caliper housing may be provided integrally with a knuckle part.

The brake may further include O-rings disposed on the second caliper housing and surrounding outer portions of the second coupling parts, respectively.

Since the brake apparatus for a vehicle according to the present disclosure has a structure in which the first caliper housing and the second caliper housing are coupled by means of the first coupling part and the second coupling part, a special machining tool for forming spaces for accommodating the cylinders inside the first caliper housing and the second caliper housing may not be used, thereby simplifying a machining process and reducing cost.

In addition, in the present disclosure, the first caliper housing is provided integrally with the knuckle part, and thus no fastening components, such as bolts and nuts, for coupling the first caliper housing and the knuckle part may be required, thereby reducing component costs and obtaining strength.

Furthermore, in the present disclosure, oil is transferred from the pair of first flow paths to the cylinders in both directions through the pair of second coupling parts and through the pair of second flow paths. Thus, pistons may apply uniform pressure to brake pads in response to the operation of the cylinders, thereby improving braking performance.

DETAILED DESCRIPTION OF THE ILLUSTRATED EMBODIMENTS

Figure 1:
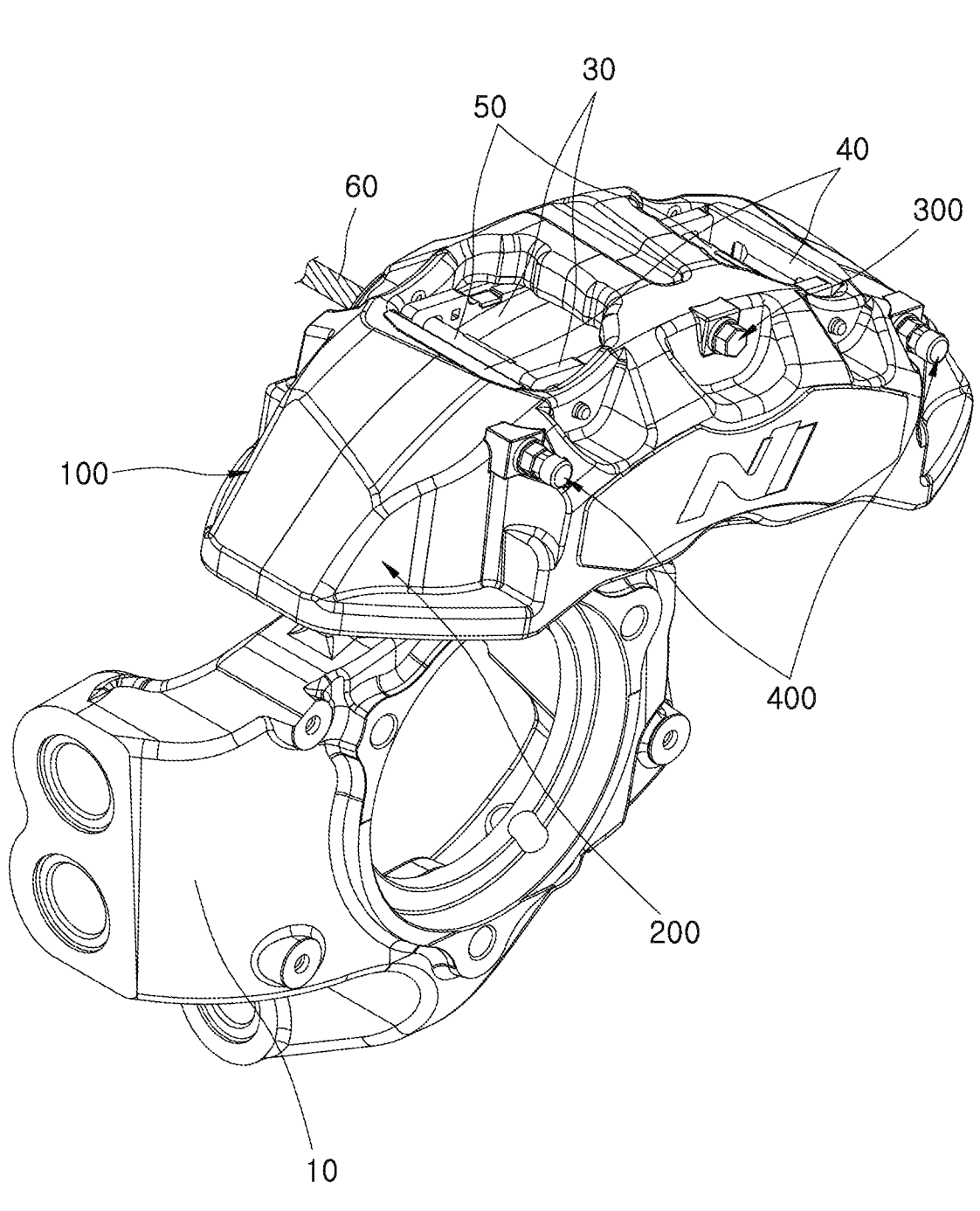
FIG. 1 is a perspective view illustrating a brake apparatus for a vehicle according to an embodiment of the present disclosure.

Hereinafter, a brake apparatus for a vehicle according to an embodiment of the present disclosure will be described below with reference to the accompanying drawings through various exemplary embodiments.

In the specification and drawings, thicknesses of lines in the drawings and sizes of constituent elements may be exaggerated for clarity and convenience. Further, the following terms are defined, considering functions thereof in the present disclosure, and may be varied according to intentions and practices of a user or an operator. Therefore, the terms should be defined on the basis of the contents of the entire specification.

Figure 2:
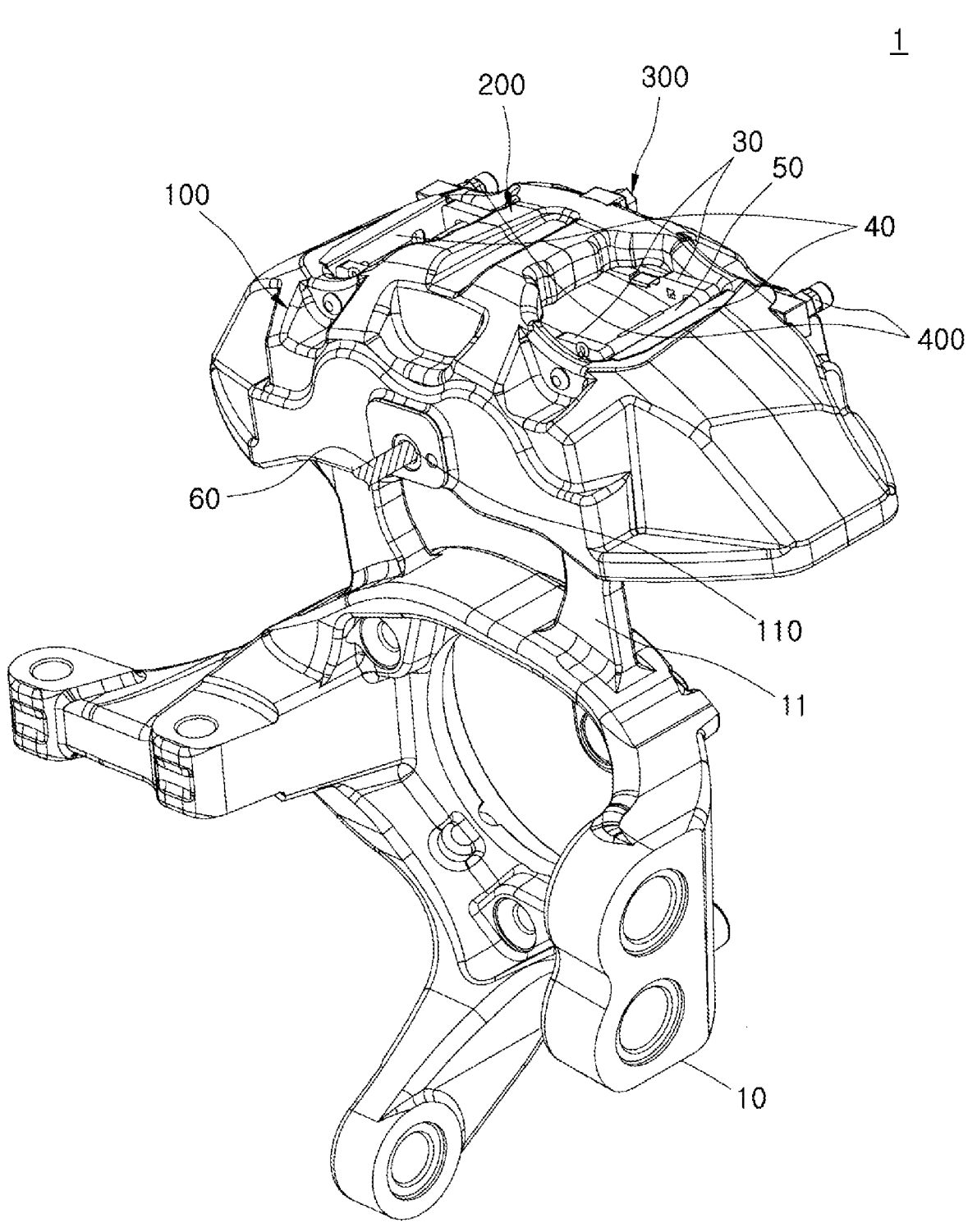
FIG. 2 is a perspective view illustrating the brake apparatus for a vehicle according to an embodiment of the present disclosure, viewed in a different direction.
Figure 3:
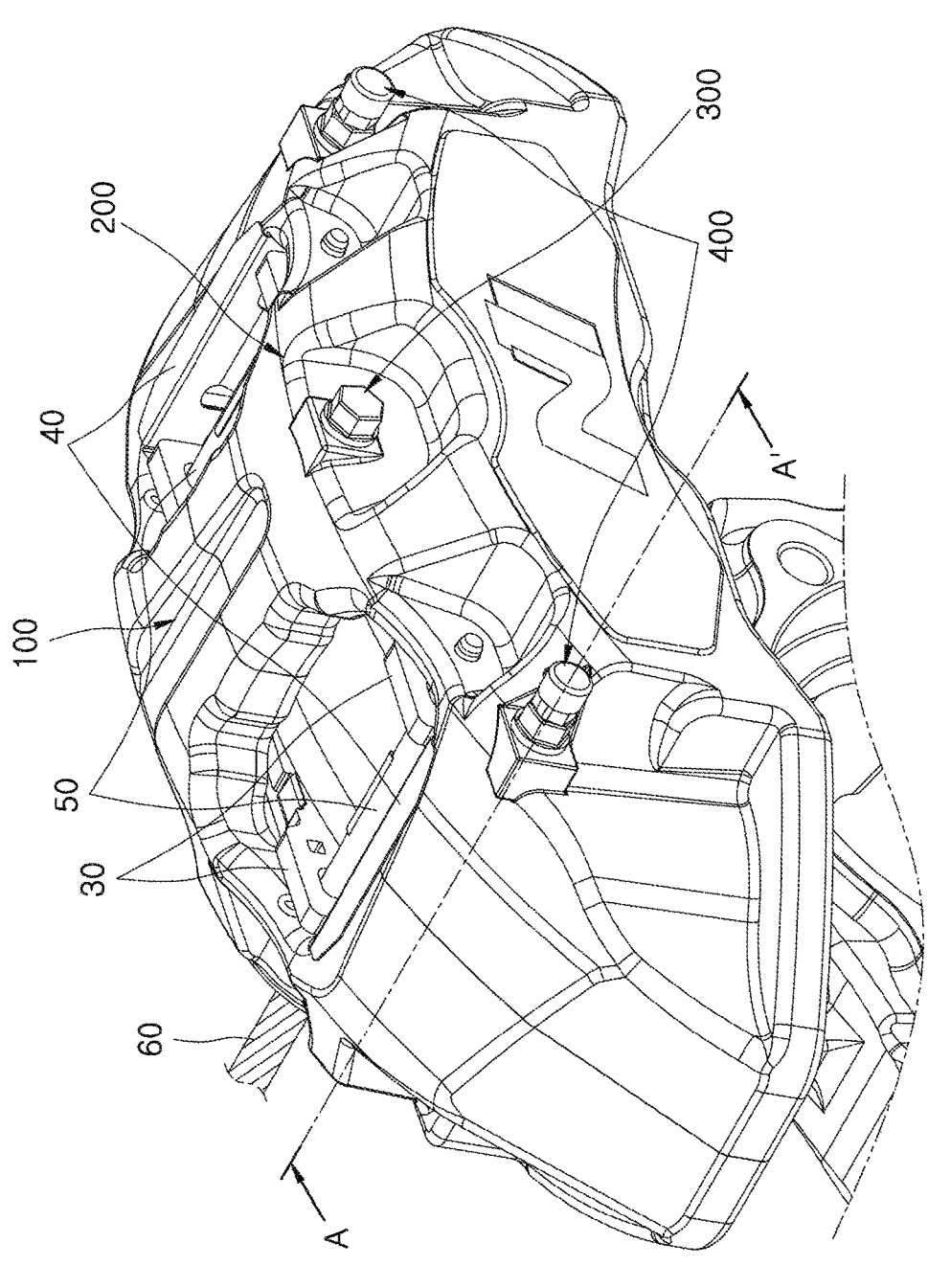
FIG. 3 is an enlarged view illustrating key parts of the brake apparatus for a vehicle according to an embodiment of the present disclosure.
Figure 4:
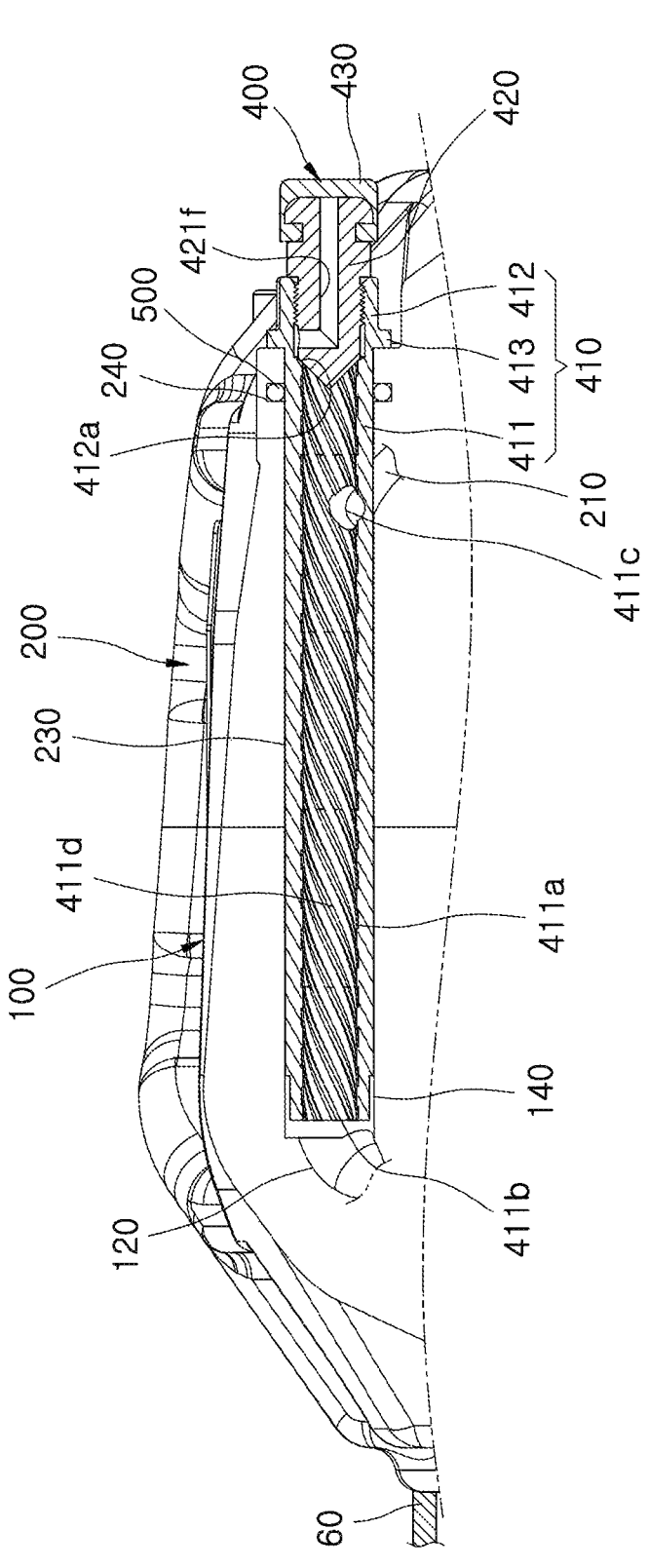
FIG. 4 is a cross-sectional view taken along line A-A' in FIG. 3.
Figure 5:
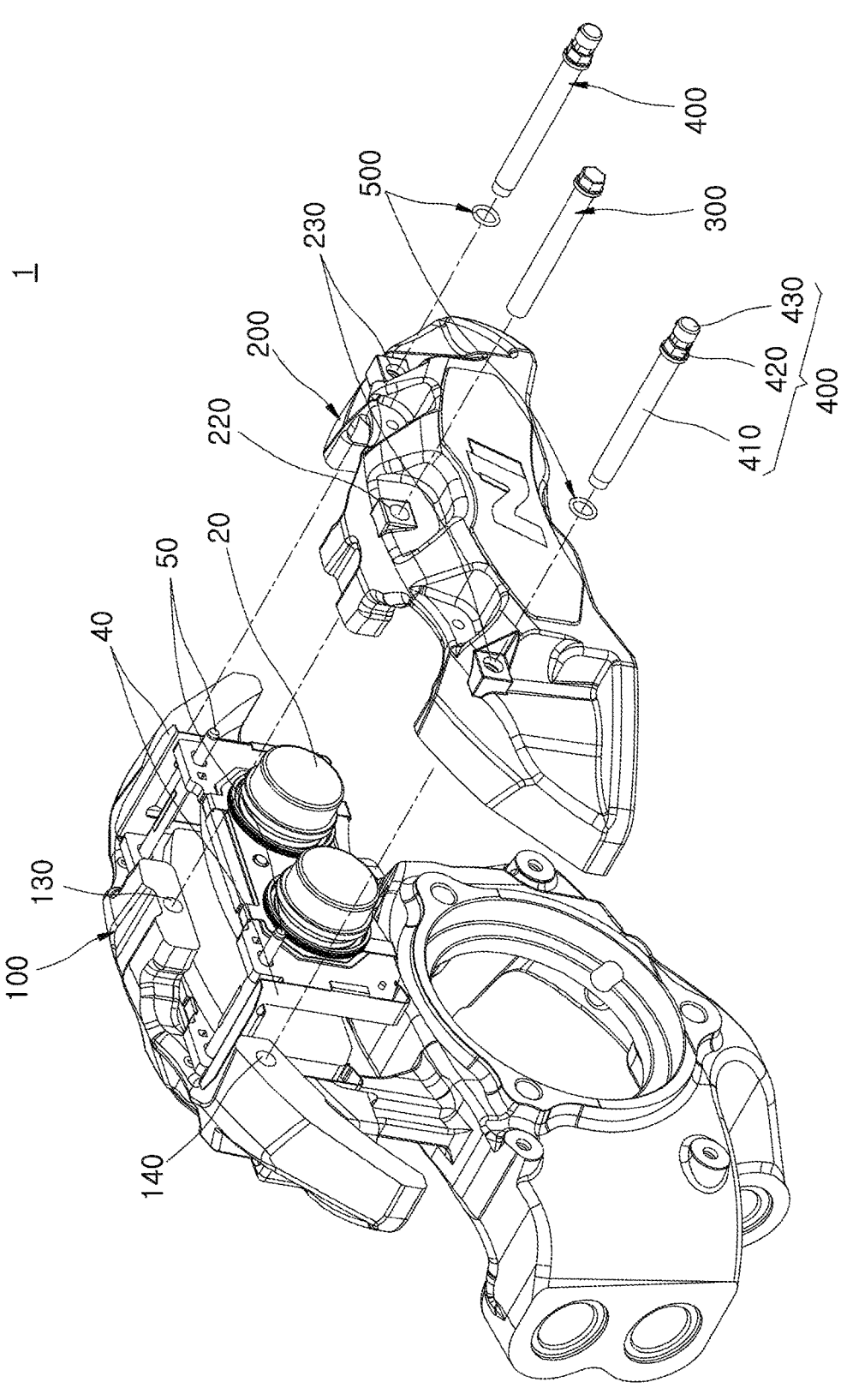
FIG. 5 is an exploded perspective view illustrating the brake apparatus for a vehicle according to an embodiment of the present disclosure.
Figure 6:
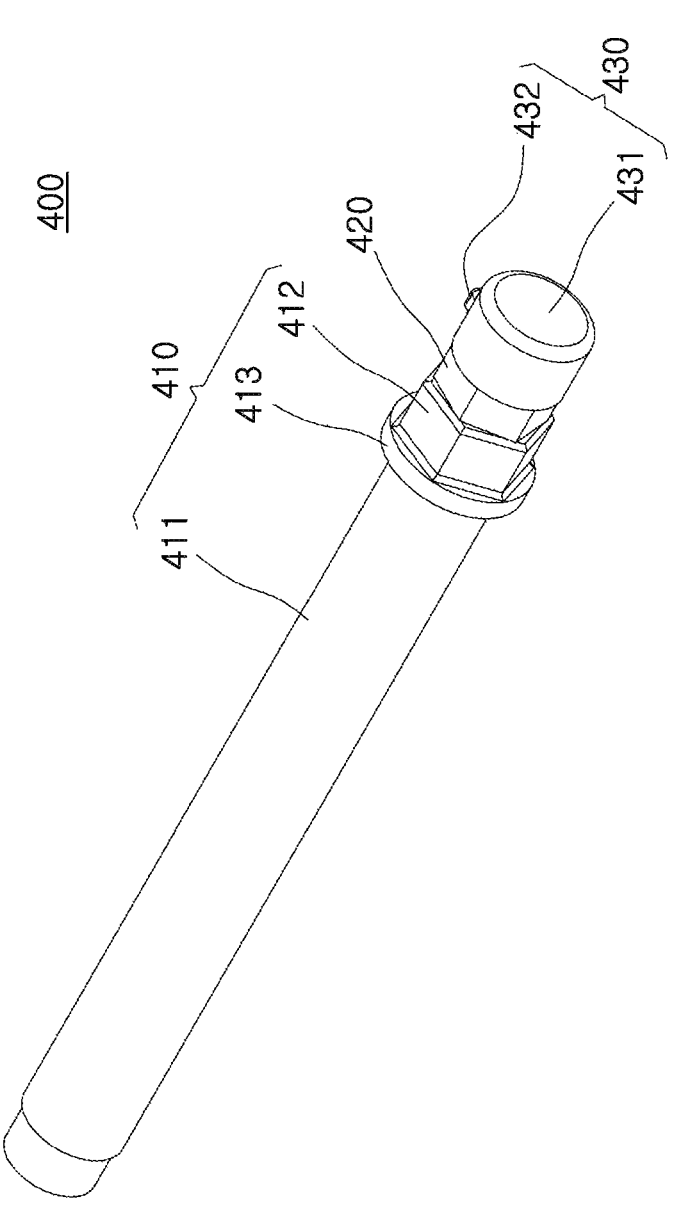
FIG. 6 is a perspective view illustrating the second coupling part in the brake apparatus for a vehicle according to an embodiment.
Figure 7:
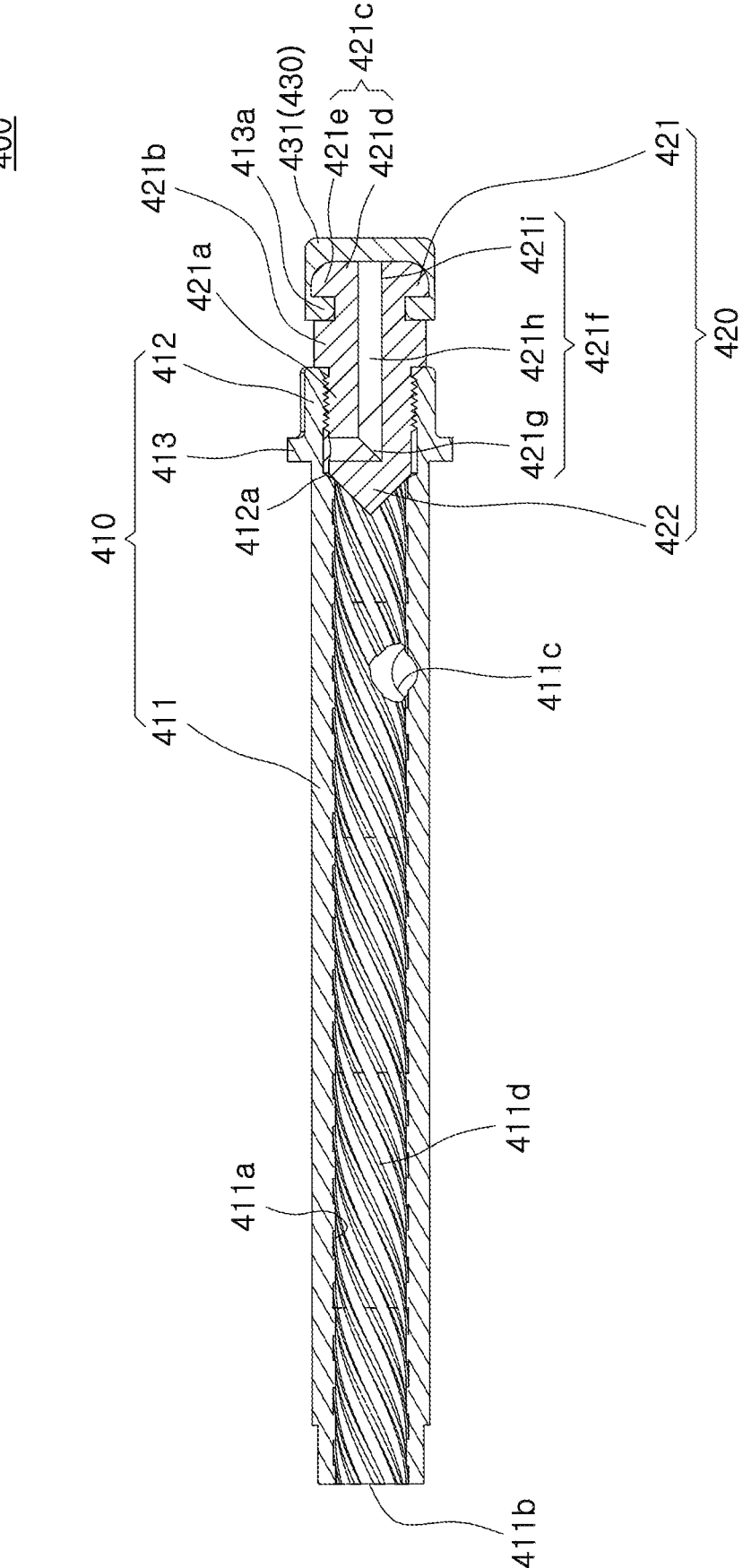
FIG. 7 is a cross-sectional view of FIG. 6.
Figure 8:
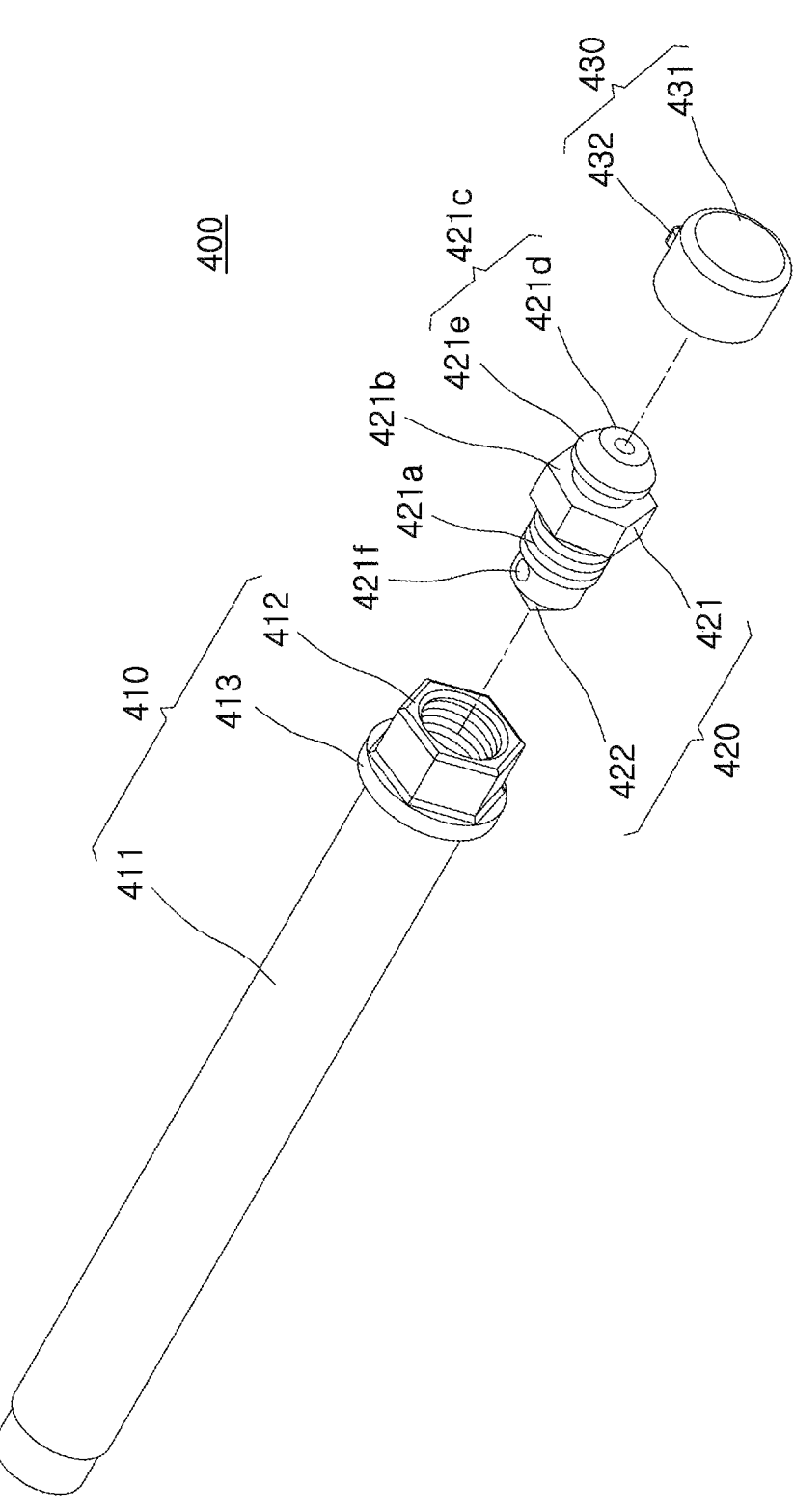
FIG. 8 is an exploded perspective view illustrating the second coupling part in the brake apparatus for a vehicle according to an embodiment.
Figure 9:
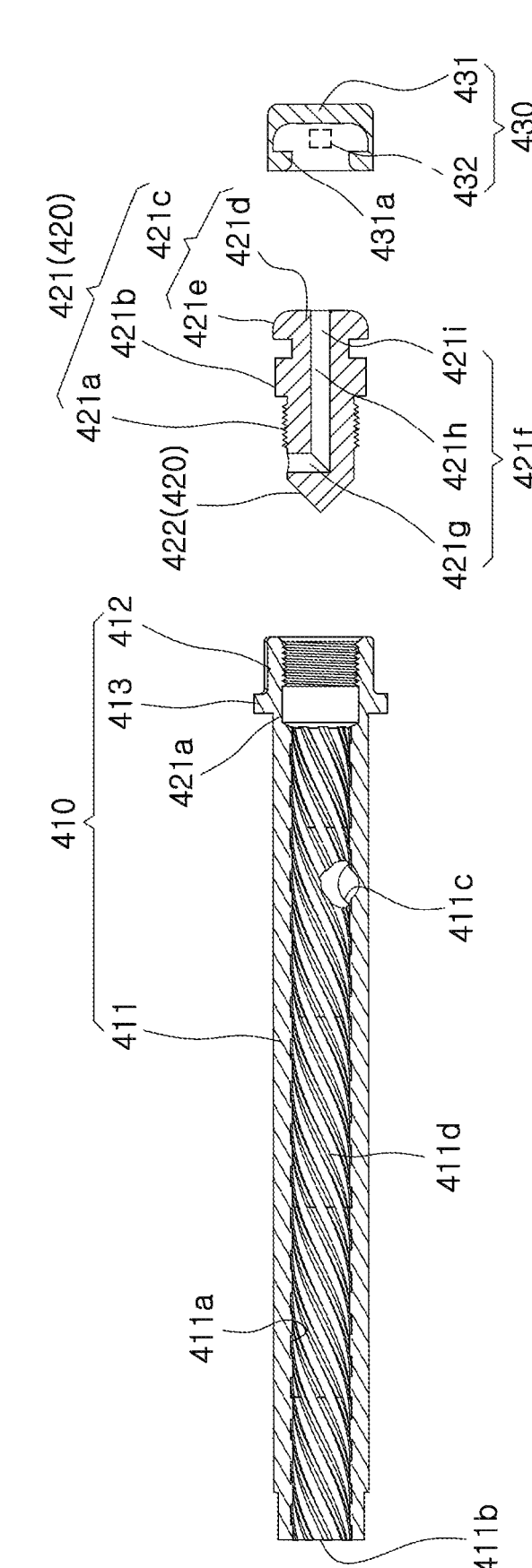
FIG. 9 is a cross-sectional view of FIG. 8.
Figure 10:
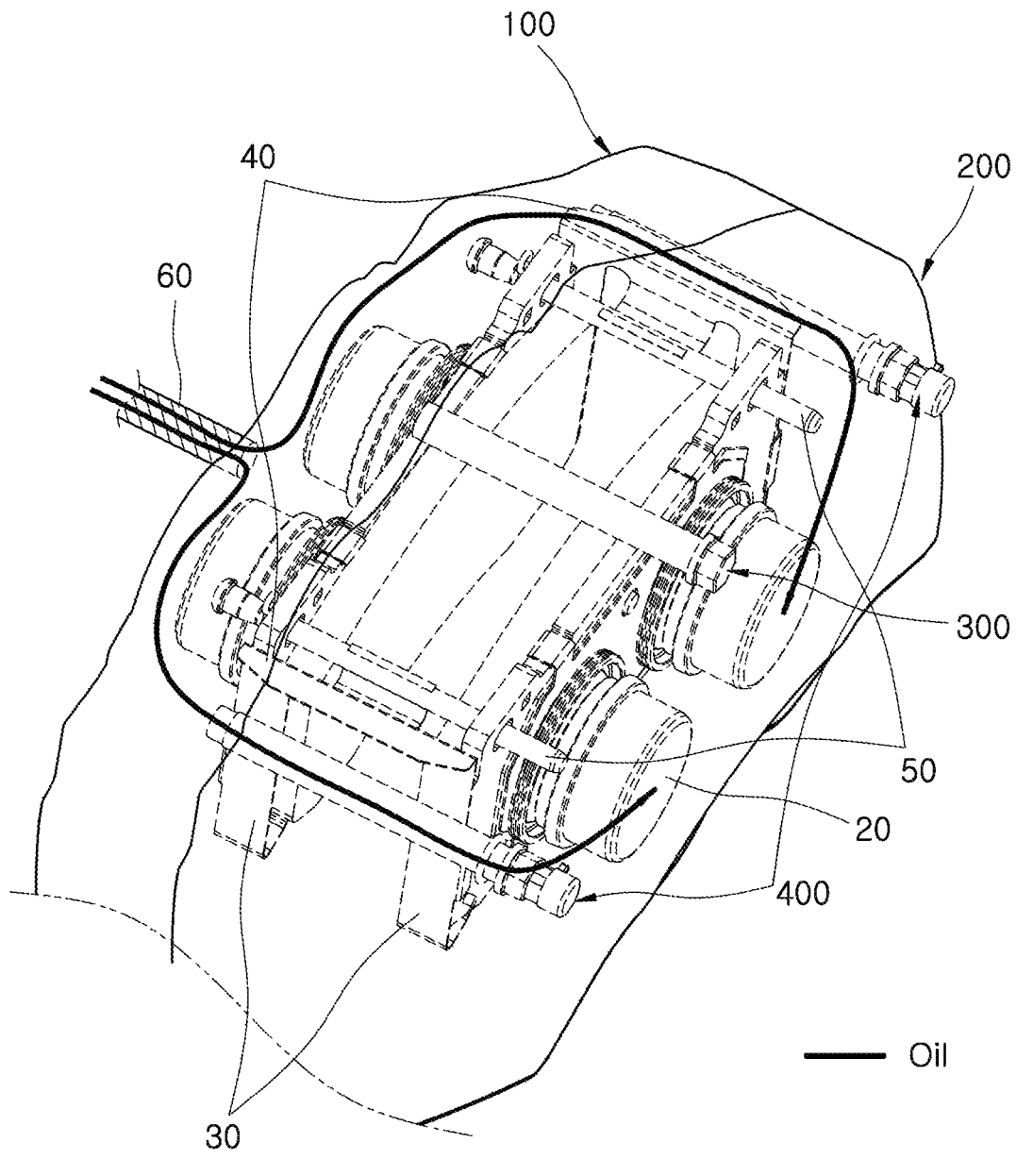
FIG. 10 is a diagram illustrating oil supply flow paths in the brake apparatus for a vehicle according to an embodiment.
Figure 11:
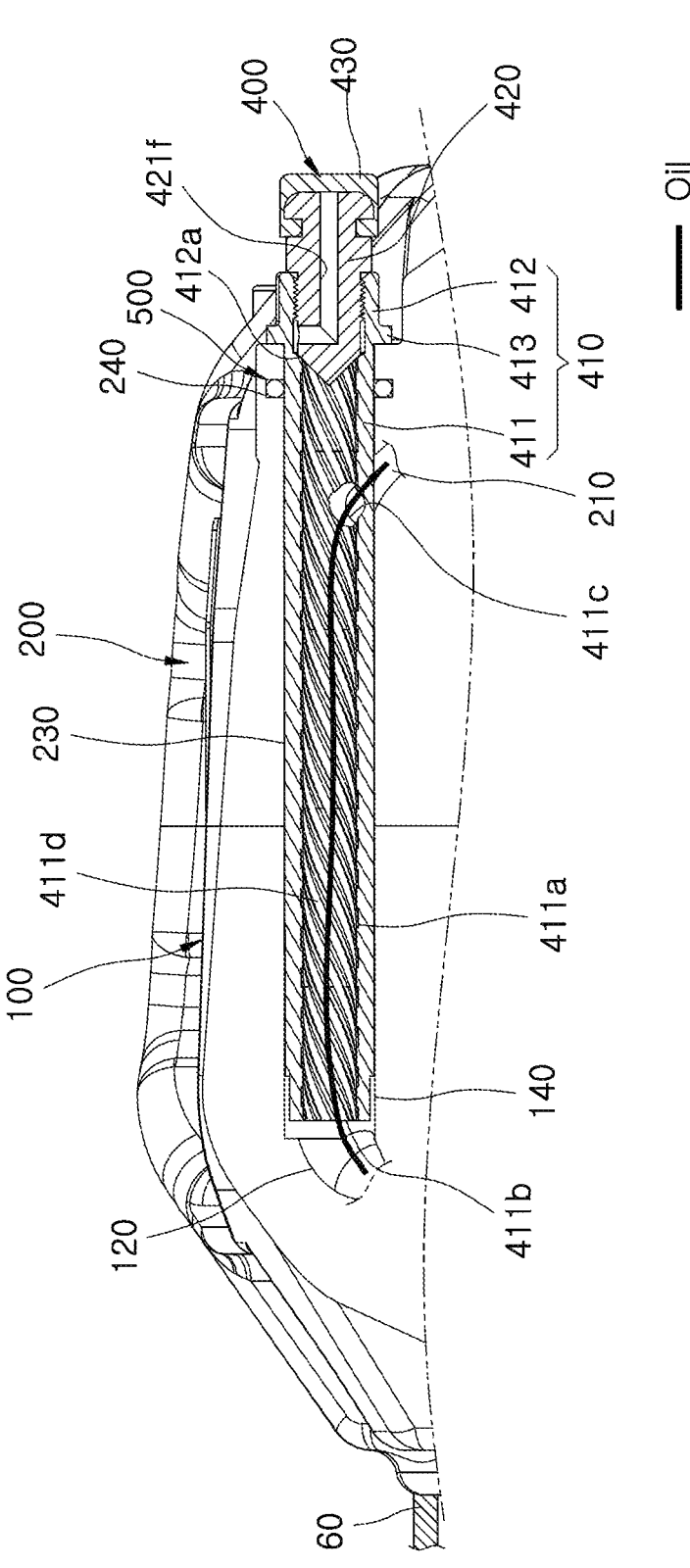
FIG. 11 is a cross-sectional view illustrating key parts of FIG. 10.
Figure 12A:
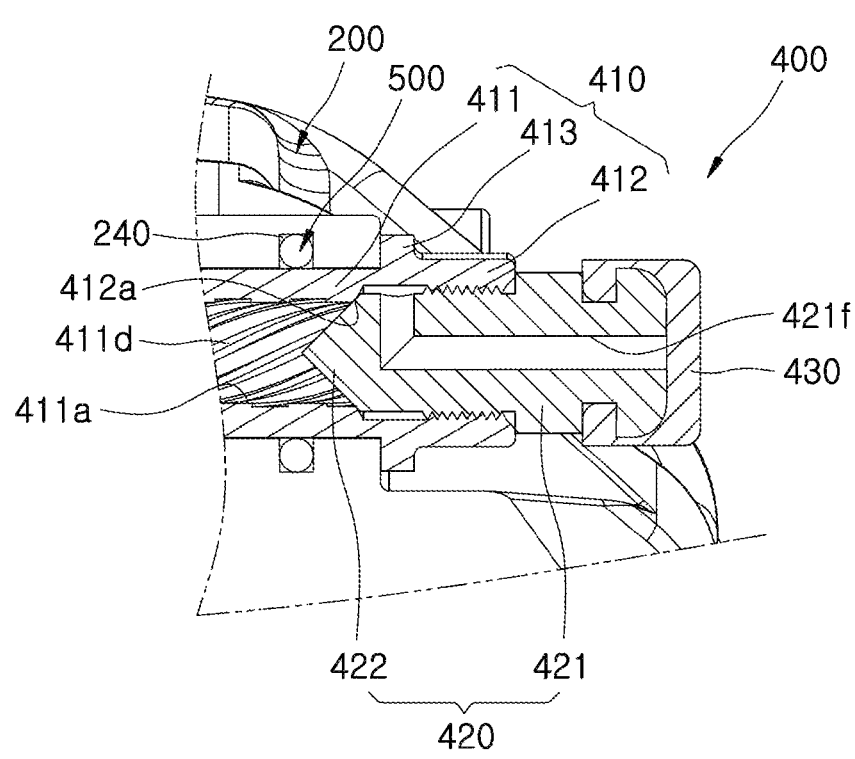
FIGS. 12A and 12B are cross-sectional views illustrating the air entering through the second coupling part in the brake apparatus for a vehicle according to an embodiment.
Figure 12B:
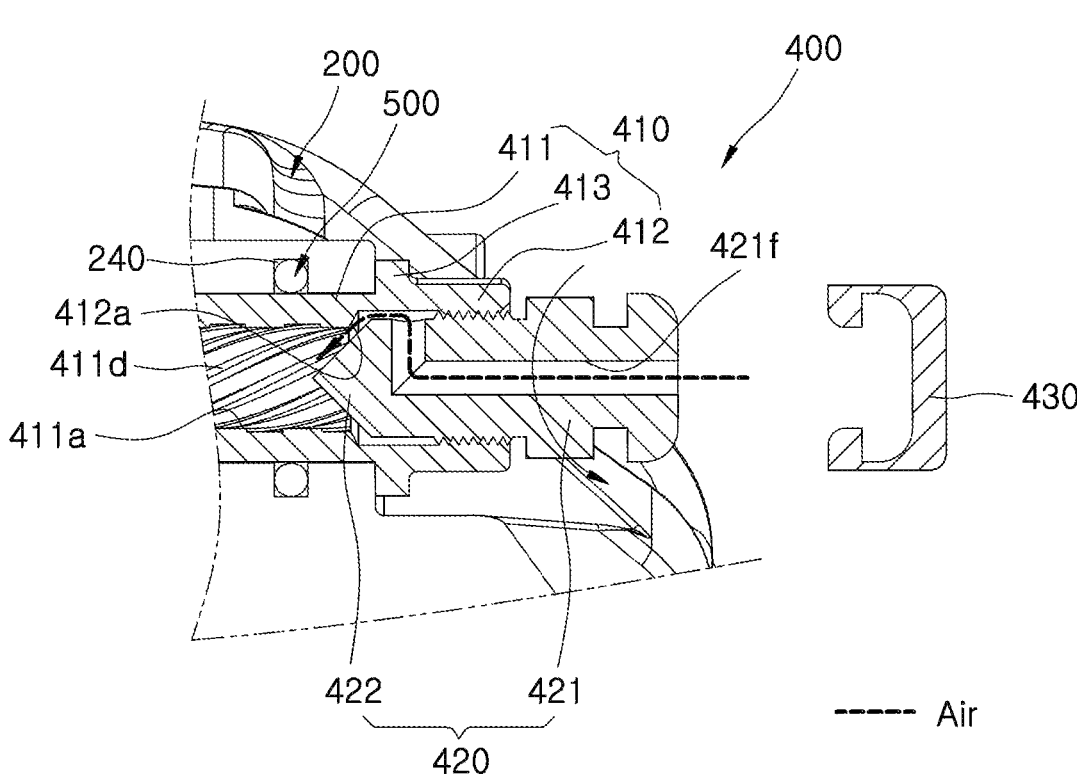

FIG. 1 is a perspective view illustrating a brake apparatus for a vehicle according to an embodiment of the present disclosure, FIG. 2 is a perspective view illustrating the brake apparatus for a vehicle according to an embodiment of the present disclosure, viewed in a different direction, FIG. 3 is an enlarged view illustrating key parts of the brake apparatus for a vehicle according to an embodiment of the present disclosure, FIG. 4 is a cross-sectional view taken along line A-A' in FIG. 3, FIG. 5 is an exploded perspective view illustrating the brake apparatus for a vehicle according to an embodiment of the present disclosure, FIG. 6 is a perspective view illustrating a second coupling part in the brake apparatus for a vehicle according to an embodiment, FIG. 7 is a cross-sectional view of FIG. 6, FIG. 8 is an exploded perspective view illustrating the second coupling part in the brake apparatus for a vehicle according to an embodiment, FIG. 9 is a cross-sectional view of FIG. 8, FIG. 10 is a diagram illustrating oil supply flow paths in the brake apparatus for a vehicle according to an embodiment, FIG. 11 is a cross-sectional view illustrating key parts of FIG. 10, and FIGS. 12A and 12B are cross-sectional views illustrating the air entering through the second coupling part in the brake apparatus for a vehicle according to an embodiment.

Referring to FIGS. 1 to 9, a brake apparatus 1 for vehicles according to an embodiment of the present disclosure includes a first caliper housing 100, a second caliper housing 200, a first coupling part 300, and second coupling parts 400.

The first caliper housing 100 includes an inlet 110 through which oil enters and first flow paths 120 connected to the inlet 110 and allowing oil to pass therethrough. The first flow paths 120 may be provided as one or more first flow paths. In the present embodiment, two first flow paths 120 are illustrated but the present disclosure is not limited thereto. One first flow path 120 or three or more first flow paths 120 may be provided. Each of the plurality of first flow paths 120 is connected to the inlet 110.

The first caliper housing 100 is disposed opposite to the second caliper housing 200. The first caliper housing 100 has the inlet 110 in the central portion thereof. The inlet 110 is connected to a hose 60. Oil enters the inlet 110 through the hose 60.

The plurality of first flow paths 120 are respectively connected to the inlet 110 and extend from the inlet 110 in different directions. Oil having entered the inlet 110 is supplied to the plurality of first flow paths 120 in a distributed manner.

The plurality of first flow paths 120 may be disposed on both sides of the inlet 110 to be symmetric to each other. In the present embodiment, two first flow paths 120 are provided, in which one first flow path 120 is disposed to bypass the inlet 110 to the left, and the other first flow path 120 is disposed to bypass the inlet 110 to the right.

The first caliper housing 100 includes a first coupling hole 130 to which the first coupling part 300 is coupled while extending therethrough and second coupling holes 140 connected to the first flow paths 120 and to which the second coupling parts 400 are coupled while extending therethrough, respectively.

The number of the second coupling holes 140 may be the same as the number of the first flow paths 120. Thus, when a plurality of first flow paths 120 are provided, a plurality of second coupling holes 140 may be provided in the same number.

The second coupling parts 400 are coupled to the second coupling holes 140, respectively. The second coupling parts 400 are connected to the first flow paths 120, respectively. The number of the second coupling parts 400 may be the same as the number of the first flow paths 120. Thus, when a plurality of first flow paths 120 are provided, a plurality of second coupling parts 400 may be provided in the same number. Each of the plurality of second coupling parts 400 is connected to a corresponding one of the plurality of first flow paths 120.

The first coupling hole 130 may be disposed in the central portion of the first caliper housing 100, whereas the second coupling holes 140 may be disposed in the first caliper housing 100 on both sides of the first coupling hole 130.

The first caliper housing 100 may be connected to a knuckle part 10 through a connecting bridge 11. The first caliper housing 100 may be provided integrally with the knuckle part 10.

Since the first caliper housing 100 and the knuckle part 10 are integrated through casting, no separate fastening components, such as bolts and nuts, for coupling the first caliper housing 100 and the knuckle part 10 may be required, thereby reducing cost due to the component simplification. In addition, since the first caliper housing 100 and the knuckle part 10 are integrated, noise and vibration may be reduced, and strength may be increased.

The second caliper housing 200 is disposed opposite to the first caliper housing 100.

The second caliper housing 200 has second flow paths 210 allowing oil to pass therethrough and connected to cylinders 20, respectively. In the present embodiment, two second flow paths 210 are illustrated, but the present disclosure is not limited thereto. One second flow path 210 or three or more second flow paths 210 may be provided.

The number of the second flow paths 210 may be the same as the number of the first flow paths 120. Thus, when a plurality of first flow paths 120 are provided, a plurality of second flow paths 210 may be provided in the same number. Each of the plurality of second flow paths 210 is disposed opposite to a corresponding one of the plurality of first flow paths 120.

The second caliper housing 200 includes a third coupling hole 220 to which the first coupling part 300 is coupled while extending therethrough and fourth coupling holes 230 to which the second coupling parts 400 are coupled while extending therethrough, respectively.

The third coupling hole 220 is formed in the central portion of the second caliper housing 200 and disposed to face the first coupling hole 130. The fourth coupling holes 230 are formed in the second caliper housing 200. The fourth coupling holes 230 may be disposed on both sides of the third coupling hole 220 so as to face the second coupling holes 140, respectively.

The second caliper housing 200 further includes O-ring coupling recesses 240 connected to the fourth coupling holes 230 and configured such that O-rings 500 are mounted therein.

The first caliper housing 100 and the second caliper housing 200 surround a pair of brake pads 30. A pair of pin members 50 are coupled to the first caliper housing 100 and the second caliper housing 200 while extending therethrough. The pair of brake pads 30 are slidably coupled to the pair of pin members 50.

At least one of the pair of brake pads 30 is pressed by the operation of the cylinders 20 so as to slide on the pair of pin members 50. Thus, the brake pads 30 may be pressed against a brake disk (not shown) disposed between the brake pads 30.

The first coupling part 300 couples the first caliper housing 100 and the second caliper housing 200.

The first coupling part 300 may be fastened to the first coupling hole 130 of the first caliper housing 100 while extending through the third coupling hole 220 of the second caliper housing 200 and the first coupling hole 130 of the first caliper housing 100. In this manner, the first caliper housing 100 and the second caliper housing 200 may be integrally coupled through the first coupling part 300.

The second coupling parts 400 may be fastened to the second coupling holes 140 of the first caliper housing 100 while extending through the fourth coupling holes 230 of the second caliper housing 200 and the second coupling holes 140 of the first caliper housing 100. In this manner, the first caliper housing 100 and the second caliper housing 200 may be integrally coupled through the second coupling parts 400.

Since the first caliper housing 100 and the second caliper housing 200 are coupled through the first coupling part 300 and the second coupling parts 400, coupling force may be further increased.

Since the first caliper housing 100 and the second caliper housing 200 are coupled through the first coupling part 300 and the second coupling parts 400, a special machining tool for forming spaces for accommodating the cylinders 20 inside the first caliper housing 100 and the second caliper housing 200 may not be used, thereby simplifying a machining process and reducing cost.

The second coupling parts 400 connect the first flow paths 120 and the second flow paths 210. Thus, the first flow paths 120, the second flow paths 210, and the second coupling parts 400 may be provided in the same number. One of the plurality of first flow paths 120 and one of the plurality of second flow paths 210 are disposed opposite to each other. Here, the first flow path 120 and the second flow path 210 opposite to each other are connected to each other through the second coupling part 400.

Thus, as in the present embodiment, when two first flow paths 120 are provided, two second flow paths 210 opposite to the two first flow paths 120 are provided and two second coupling parts 400 connecting the first flow paths 120 and the second flow paths 210, respectively, are provided.

Each of the second coupling parts 400 has defined therein a connecting flow path portion 411*a* through which oil passes. A plurality of second coupling parts 400 may be provided. The plurality of second coupling parts 400 may be disposed on both sides of the first coupling part 300.

Since the second coupling parts 400 is provided with the connecting flow path portion 411*a* through which oil passes, it is not required to separately form an oil flow path portion in fabrication of the first caliper housing 100 and the second caliper housing 200. Thus, the shape of a core is simplified, and fabrication performance is improved. In addition, it is not required to add separate flow path components, such as a pipe, thereby improving assemblability and reducing fabrication cost.

Oil having entered the first caliper housing 100 through the inlet 110 is distributed into the plurality of first flow paths 120. Afterwards, the oil flows through the first flow paths 120, the second coupling parts 400, and the second flow paths 210 so as to be transferred to the cylinders 20 through a plurality of routes. Consequently, pistons (not shown) may apply uniform pressure to the brake pads 30. That is, uniform surface pressure may be applied to the brake pads 30, thereby improving the quality of braking.

In the present embodiment, two first flow paths 120, two second coupling parts 400, and two second flow paths 210 are disposed on both sides of the inlet 110. Thus, oil may be transferred to the cylinders 20 in both directions through the symmetrically disposed flow paths, i.e., the first flow paths 120, the second coupling parts 400, and the second flow paths 210, so that the pistons (not shown) may apply uniform pressure to the brake pads 30.

Each of the second coupling parts 400 may include a bolt 410, a bleeder screw 420, and an elastic member 430 (see FIGS. 6 to 12B).

The bolt 410 may couple the first caliper housing 100 and the second caliper housing 200. The bolt 410 may be configured such that a corresponding one of the O-rings 500 comes into contact with the outer circumferential surface of the bolt 410 and the connecting flow path portion 411a is formed inside the bolt 410.

The bolt 410 includes a bolt body 411 and a bolt extension 412. The bolt body 411 includes the connecting flow path portion 411a. A groove 411d may be formed on the inner circumferential surface of the connecting flow path portion 411a to reduce flow resistance of oil.

The groove 411d may be formed in the shape of a helical groove. The groove 411d may reduce flow resistance of oil and increase flow rate of the oil while the oil is passing through the connecting flow path portion 411a. Thus, the oil may be rapidly supplied from the first flow paths 120 to the second flow paths 210 through the bolts 410.

The connecting flow path portion 411a may include a connecting inlet 411b through which oil enters from the corresponding first flow path 120 and a discharge hole 411c connected to the corresponding second flow path 210 such that the oil is discharged to the second flow path 210.

The bolts 410 connect the plurality of first flow paths 120 and the plurality of second flow paths 210, respectively, so that oil may be rapidly supplied toward the cylinders 20 through the first caliper housing 100 and the second caliper housing 200.

The bolt extension 412 is connected to the bolt body 411, and the bleeder screw 420 is rotatably coupled to the bolt extension 412. The bleeder screw 420 may be screw-fastened to the interior of the bolt extension 412. The outer surface of the bolt extension 412 has a polygonal shape, by which the fastening operation of the bolt extension 412 using a fastening tool, such as a spanner, is enabled.

The bolt 410 further includes an engagement flange 413. The engagement flange 413 extends outward from the bolt extension 412, and is configured to be in contact with the second caliper housing 200, thereby restricting the bolt 410 from being excessively inserted into the second caliper housing 200.

The bleeder screw 420 is rotatably coupled to the bolt 410. Even in a state in which the bleeder screw 420 is coupled to the bolt 410, the distance between the bleeder screw 420 and one end of the bolt 410 may be adjusted by manipulating the direction of rotation of the bleeder screw 420.

As illustrated in FIG. 12A, when the front end of the bleeder screw 420 is completely in close contact with the rear end of the bolt 410, entrance of the air toward the connecting flow path portion 411a is blocked. In contrast, as illustrated in FIG. 12B, when the front end of the bleeder screw 420 is spaced apart from the rear end of the bolt 410 by a predetermined distance, the air may enter toward the connecting flow path portion 411a. Here, the entrance of the air may be increased by detaching the elastic member 430 from the bleeder screw 420.

When the bleeder screw 420 is rotated in a set rotation, the bleeder screw 420 may be spaced apart from the bolt 410, thereby allowing the air to enter toward the connecting flow path portion 411a. In contrast, when the bleeder screw 420 is rotated in a direction opposite the set direction, the bleeder screw 420 comes into contact with the bolt 410, thereby blocking entrance of the air toward the connecting flow path portion 411a.

The bleeder screw 420 includes a bleeder screw body 421 and a bleeder screw contact portion 422. The bleeder screw body 421 is screw-coupled to the bolt extension 412, and the elastic member 430 is coupled to the bleeder screw body 421. The bleeder screw body 421 has an air intake hole 421f through which air enters.

The bleeder screw body 421 includes a bleeder screw stem 421a, a nut engaging portion 421b, and a mounting portion 421c. The bleeder screw stem 421a is screw-engaged with the bolt extension 412, and has a first air intake hole 421g of the air intake hole 421f.

The nut engaging portion 421b is connected to the bleeder screw stem 421a, and has a second air intake hole 421h of the air intake hole 421f connected to the first air intake hole 421g. The nut engaging portion 421b has a polygonal outer shape, by which the fastening operation of the nut engaging portion 421b using a fastening tool, such as a spanner, is enabled.

The mounting portion 421c is connected to the nut engaging portion 421b, and includes a third air intake hole 421i of the air intake hole 421f connected to the second air intake hole 421h. The elastic member 430 is mounted on the mounting portion 421c, and surrounds the third air intake hole 421i.

The mounting portion 421c includes a mounting main portion 421d and an engagement portion 421e. The mounting main portion 421d has the third air intake hole 421i. The engagement portion 421e protrudes outward from the mounting main portion 421d, and is caught by an engagement protrusion 431a of the elastic member 430. Thus, the mounting portion 421c and the elastic member 430 to be described later may be fitted and coupled to each other.

The bleeder screw contact portion 422 is connected to the bleeder screw body 421 and in contact with the bolt extension 412.

The bleeder screw contact portion 422 is configured such that the width thereof decreases with the distance from the bleeder screw body 421. The bolt extension 412 has defined therein a contact hole 412a having the shape conforming to the bleeder screw contact portion 422.

Thus, when the bleeder screw 420 is rotated on the bolt 410 in the set direction, the size of a space defined between the contact hole 412a and the bleeder screw contact portion 422 may be adjusted depending on the degree of the rotation of the bleeder screw 420. As a result, the amount and rate of the air transferred to the connecting flow path portion 411a of the bolt 410 through the air intake hole 421f of the bleeder screw body 421 may be adjusted.

The elastic member 430 is detachably coupled to the bleeder screw 420, and surrounds the bleeder screw 420. The elastic member 430 includes an elastic member body 431 and a handle block 432. The elastic member body 431 is mounted on the mounting portion 421c of the bleeder screw 420. The elastic member body 431 is provided with the engagement protrusion 431a that protrudes inward, and the mounting portion 421c of the bleeder screw 420 is caught by the engagement protrusion 431a.

The handle block 432 protrudes from the elastic member body 431 in one direction, and a mechanic may hold the handle block 432 with a hand. Thus, the elastic member 430 may be easily attached to and detached from the bleeder screw 420.

The O-rings 500 are coupled to the second caliper housing 200 while in contact with the second coupling parts 400, respectively. The O-rings 500 remove gaps between the second coupling parts 400 and the second caliper housing 200, thereby preventing oil from leaking to the outside.

Hereinafter, the operation and effects of the brake apparatus for a vehicle according to an embodiment of the present disclosure will be described with reference to FIGS. 10 to 12B.

When braking force is generated by the brake apparatus 1 for vehicles, oil is transferred to the first caliper housing 100 through the hose 60. The oil transferred to the first caliper housing 100 is supplied to the cylinders 20 through the second coupling parts 400 and through the second caliper housing 200 (see FIGS. 10 and 11).

Specifically, the oil is supplied to the inlet 110 of the first caliper housing 100 through the hose 60. The oil supplied to the inlet 110 is transferred to the plurality of first flow paths 120, each of which is connected to the inlet 110, in a distributed manner.

The second coupling parts 400 are provided as a plurality of coupling parts 400 coupling the first caliper housing 100 and the second caliper housing 200 at a plurality of points. The oil supplied to the first flow paths 120 is transferred to the connecting flow path portions 411a provided inside the second coupling parts 400.

The oil that has passed through the plurality of first flow paths 120 is supplied to the cylinders 20 by passing through one of the plurality of first coupling parts 400 connected to the corresponding first flow path 120 and then through one of the plurality of second flow paths 210 connected to the corresponding first coupling part 400. The second flow paths 210 are formed in the second caliper housing 200.

In this manner, the oil is transferred to the cylinders 20 through a plurality of routes, and thus the pistons (not shown) may rapidly apply uniform pressure to the brake pads 30. That is, uniform surface pressure may be applied to the brake pads 30, thereby improving the quality of braking. In the present embodiment, the oil is supplied to the cylinders 20 in both directions, and thus the pistons (not shown) may apply uniform pressure to the brake pads 30 in response to the operation of the cylinders 20.

Thus, when two first flow paths 120 are provided, separate oil flow paths passing through the two first flow paths 120, the first coupling parts 400, and the second flow paths 210 are provided as two oil flow paths. When three or more first flow paths 120 are provided, separate oil flow paths passing through the two first flow paths 120, the first coupling parts 400, and the second flow paths 210 are also provided as three or more oil flow paths.

As described above, the oil that has passed through the first flow paths 120 is transferred to the second flow paths 210 through the connecting flow path portion 411a of the second coupling parts 400. That is, the oil that has passed through the first flow paths 120 enters the connecting inlet 411b of the connecting flow path portion 411a, passes through the connecting flow path portion 411a, and is discharged from the discharge hole 411c of the connecting flow path portion 411a so as to be transferred to the second flow paths 210. Here, since the groove 411d is formed in the connecting flow path portion 411a, flow resistance is reduced and flow rate is increased during the passage of the oil. Consequently, the oil may be rapidly supplied to the second flow paths 210.

Afterwards, when the supply of the air into the second coupling parts 400 is necessary, the elastic members 430 of the second coupling parts 400 are detached from the bleeder screws 420 of the second coupling parts 400, and then the bleeder screws 420 screw-engaged with the bolts 410 of the second coupling parts 400 are rotated in the set direction, thereby allowing the air to be supplied to the bolts 410 of the second coupling parts 400 through the bleeder screws 420

(see FIGS. 12A and 12B). In a state in which the elastic members 430 are coupled to the bleeder screws 420, the entrance of the air may be blocked since the air intake holes 421f are closed with the elastic members 430.

Specifically, the air having entered through the air intake holes 421f of the bleeder screws 420 is supplied to the connecting flow path portions 411a of the bolts 410 through the spaces defined between bolts 410 and the bleeder screws 420 when the bleeder screws 420 rotate in the set direction.

As described above in the brake apparatus 1 for vehicles according to the present disclosure, the oil from the first flow paths 120 passes through the second coupling parts 400 and then is transferred to the cylinders 20 in both directions through the second flow paths 210. The pistons (not shown) may apply uniform pressure to the brake pads 30 in response to the operation of the cylinders 20, thereby improving braking performance.

In addition, since the first caliper housing 100 and the second caliper housing 200 are coupled by means of the first coupling part 300 and the second coupling parts 400, it is not required to use a special machining tool for forming spaces inside the first caliper housing 100 and the second caliper housing 200 in which the cylinders 20 are to be disposed. Consequently, a machining process may be simplified and facilitated.

Furthermore, since the first caliper housing 100 is integrated with the knuckle part 10, no fastening components, such as bolts and nuts, for coupling the first caliper housing 100 and the knuckle part 10 may be required, thereby simplifying components, reducing component cost, and obtaining strength.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, the brake apparatus comprising:
   a first caliper housing comprising an inlet through which oil enters and one or more first flow paths connected to the inlet and allowing oil to pass therethrough;
   a second caliper housing disposed opposite to the first caliper housing, and comprising one or more second flow paths allowing oil to pass therethrough and connected to one or more cylinders, respectively;
   a first coupling part coupling the first caliper housing and the second caliper housing;
   one or more second coupling parts coupling the first caliper housing and the second caliper housing, and respectively comprising a connecting flow path portion connecting a corresponding one of the first flow path and a corresponding one of the one or more second flow paths so that oil passes therethrough; and
   a bleeder screw having an air intake hole formed in a bleeder screw body of the bleeder screw for allowing air to enter toward the connecting flow path portion and a bleeder screw contact portion,
   wherein each of the one or more second coupling parts includes a contact hole connected to the air intake hole, and
   wherein based on that the bleeder screw is rotated, a size of a space defined between the contact hole and the bleeder screw contact portion is adjusted depending on a degree of the rotation of the bleeder screw and the space defined between the contact hole and the bleeder screw contact portion is fluidically connected to the air intake hole.

2. The brake apparatus of claim 1, wherein the one or more second coupling parts comprise a plurality of second coupling parts disposed on both sides of the first coupling part.

3. The brake apparatus of claim 2, wherein the one or more first flow paths comprise a plurality of first flow paths, and the one or more second flow paths comprise a plurality of second flow paths to be disposed opposite to the plurality of first flow paths, respectively, and each of the plurality of second coupling parts connects one of the plurality of first flow paths and one of the plurality of second flow paths opposite to each other, thereby allowing oil to pass through.

4. The brake apparatus of claim 3, wherein the plurality of second coupling parts are disposed on both sides of the first coupling part so as to be symmetric to each other.

5. The brake apparatus of claim 3, wherein the connecting flow path portion comprises a groove in an inner circumferential surface thereof, the groove being configured to reduce flow resistance of oil.

6. The brake apparatus of claim 3, wherein the connecting flow path portion comprises a connecting inlet through which oil enters from a corresponding one of the plurality of first flow paths and a discharge hole connected to a corresponding one of the plurality of second flow paths such that oil is discharged to the corresponding second flow path.

7. The brake apparatus of claim 3, wherein each of the plurality of second coupling parts comprises:

a bolt coupling the first caliper housing and the second caliper housing, with the connecting flow path portion being disposed inside the bolt.

8. The brake apparatus of claim 7, wherein each of the plurality of second coupling parts further comprises an elastic member detachably coupled to the bleeder screw and configured to close the air intake hole.

9. The brake apparatus of claim 8, wherein the bolt of each of the plurality of second coupling parts comprises:

a bolt body comprising the connecting flow path portion; and a bolt extension connected to the bolt body, with the bleeder screw being rotatably coupled to the bolt extension.

10. The brake apparatus of claim 9, wherein the bleeder screw of each of the plurality of second coupling parts comprises:

the bleeder screw body screw-coupled to the bolt extension, with the elastic member being coupled to the bleeder screw body, and the air intake hole being provided in the bleeder screw body; and the bleeder screw contact portion connected to the bleeder screw body and in contact with the bolt extension.

11. The brake apparatus of claim 10, wherein the bleeder screw contact portion is configured such that a width thereof decreases with a distance from the bleeder screw body, and the bolt extension has defined therein the contact hole having a shape conforming to the bleeder screw contact portion.

12. The brake apparatus of claim 1, wherein the first caliper housing is provided integrally with a knuckle part.

13. The brake apparatus of claim 1, further comprising O-rings disposed on the second caliper housing and surrounding outer portions of the one or more second coupling parts, respectively.

* * * * *